United States Patent
Nielson et al.

(10) Patent No.: US 9,599,771 B2
(45) Date of Patent: Mar. 21, 2017

(54) EXPANDED BEAM CONNECTOR CONCEPTS

(71) Applicant: CommScope, Inc. of North Carolina, Hickory, NC (US)

(72) Inventors: Jeffrey D. Nielson, Longmont, CO (US); Gary Gibbs, Wylie, TX (US); Matthew Cruz, Council Bluffs, IA (US); Timothy W. Anderson, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/965,895

(22) Filed: Dec. 10, 2015

(65) Prior Publication Data
US 2016/0147021 A1    May 26, 2016

Related U.S. Application Data

(63) Continuation of application No. 13/782,759, filed on Mar. 1, 2013, now abandoned, which is a
(Continued)

(51) Int. Cl.
*G02B 6/36* (2006.01)
*G02B 6/26* (2006.01)
(Continued)

(52) U.S. Cl.
CPC ............... *G02B 6/32* (2013.01); *G02B 1/11* (2013.01); *G02B 6/262* (2013.01); *G02B 6/322* (2013.01);
(Continued)

(58) Field of Classification Search
CPC .......... G02B 6/262; G02B 6/32; G02B 6/322; G02B 6/36; G02B 6/382; G02B 6/3849;
(Continued)

(56) References Cited

U.S. PATENT DOCUMENTS

| | | | |
|---|---|---|---|
| 4,461,537 A | 7/1984 | Raymer, II et al. | |
| 4,669,820 A | 6/1987 | Ten Berge | |

(Continued)

FOREIGN PATENT DOCUMENTS

| | | |
|---|---|---|
| DE | 26 49 347 A1 | 5/1977 |
| DE | 42 21 040 A1 | 1/1994 |

(Continued)

*Primary Examiner* — Akm Enayet Ullah
*Assistant Examiner* — Michael Mooney
(74) *Attorney, Agent, or Firm* — Muncy, Geissler, Olds & Lowe, P.C.

(57) ABSTRACT

A terminus for a fiber optic cable includes a ferrule. In one embodiment, an optical fiber of the cable passes through a central bore of the ferrule and is attached to a lens seated in a conical or cylindrical seat formed in an end surface of the ferrule by an epoxy. In a second embodiment, an optical fiber of the cable passes through the central bore of the ferrule. Next, a cap sleeve with a lens therein is slid over and attached to the ferrule such that the lens abuts or is attached to the optical fiber. In either embodiment, an inspection slot may optionally be formed in the ferrule and/or the cap sleeve to allow a technician to inspect the state of the attachment and/or abutment and/or spacing of the optical fiber and the lens.

17 Claims, 12 Drawing Sheets

Related U.S. Application Data continuation-in-part of application No. 12/337,212, filed on Dec. 17, 2008, now Pat. No. 8,393,804, which is a continuation-in-part of application No. 11/765,318, filed on Jun. 19, 2007, now Pat. No. 7,604,417.

(51) Int. Cl.
  *G02B 6/32*   (2006.01)
  *G02B 6/38*   (2006.01)
  *G02B 1/11*   (2015.01)

(52) U.S. Cl.
  CPC ............. *G02B 6/36* (2013.01); *G02B 6/382* (2013.01); *G02B 6/3861* (2013.01); *G02B 6/3874* (2013.01); *G02B 6/3885* (2013.01); *G02B 6/3849* (2013.01); *G02B 6/3853* (2013.01); *G02B 6/3869* (2013.01); *G02B 6/3878* (2013.01)

(58) Field of Classification Search
  CPC .. G02B 6/3853; G02B 6/3861; G02B 6/3869; G02B 6/3874; G02B 6/3878; G02B 6/3885; G02B 1/11
  USPC ... 385/33–35, 39, 50, 55, 60, 61, 70, 72–74, 385/78–80, 84–85
  See application file for complete search history.

(56) References Cited

U.S. PATENT DOCUMENTS

| | | |
|---|---|---|
| 4,684,221 A | 8/1987 | Takada |
| 4,753,510 A * | 6/1988 | Sezerman ............ G02B 6/3843 385/61 |
| 4,836,637 A | 6/1989 | Poorman et al. |
| 5,054,879 A | 10/1991 | Brown |
| 5,076,656 A | 12/1991 | Briggs et al. |
| 5,080,461 A | 1/1992 | Pimpinella |
| 5,123,073 A | 6/1992 | Pimpinella |
| 5,257,332 A | 10/1993 | Pimpinella |
| 5,386,486 A | 1/1995 | Fan et al. |
| 5,542,013 A | 7/1996 | Kaplow et al. |
| 6,004,046 A | 12/1999 | Sawada |
| 6,074,100 A | 6/2000 | Rowland et al. |
| 6,305,849 B1 | 10/2001 | Roehrs et al. |
| 6,438,288 B1 | 8/2002 | Tehrani |
| 6,625,351 B2 | 9/2003 | Cox et al. |
| 7,031,567 B2 | 4/2006 | Grinderslev et al. |
| 7,182,525 B2 | 2/2007 | Bergmann et al. |
| 2002/0009261 A1 | 1/2002 | Bhagavatula et al. |
| 2003/0223703 A1 | 12/2003 | Chen et al. |
| 2004/0091214 A1 | 5/2004 | Finona |
| 2004/0223678 A1 | 11/2004 | He et al. |
| 2005/0036735 A1 | 2/2005 | Oosterhuis et al. |
| 2006/0257076 A1 | 11/2006 | Seeley |
| 2007/0058907 A1 | 3/2007 | Mynott et al. |
| 2007/0211999 A1 | 9/2007 | Kobayashi et al. |
| 2007/0292083 A1 | 12/2007 | Nielson et al. |

FOREIGN PATENT DOCUMENTS

| | | |
|---|---|---|
| EP | 0 024 958 A1 | 3/1981 |
| EP | 0 519 219 A2 | 12/1992 |
| EP | 1 990 665 A1 | 11/2008 |
| GB | 2 145 534 A | 3/1985 |
| GB | 2 428 490 A | 1/2007 |
| WO | WO 2006/093798 A2 | 9/2006 |
| WO | WO 2007/009676 A1 | 1/2007 |

* cited by examiner

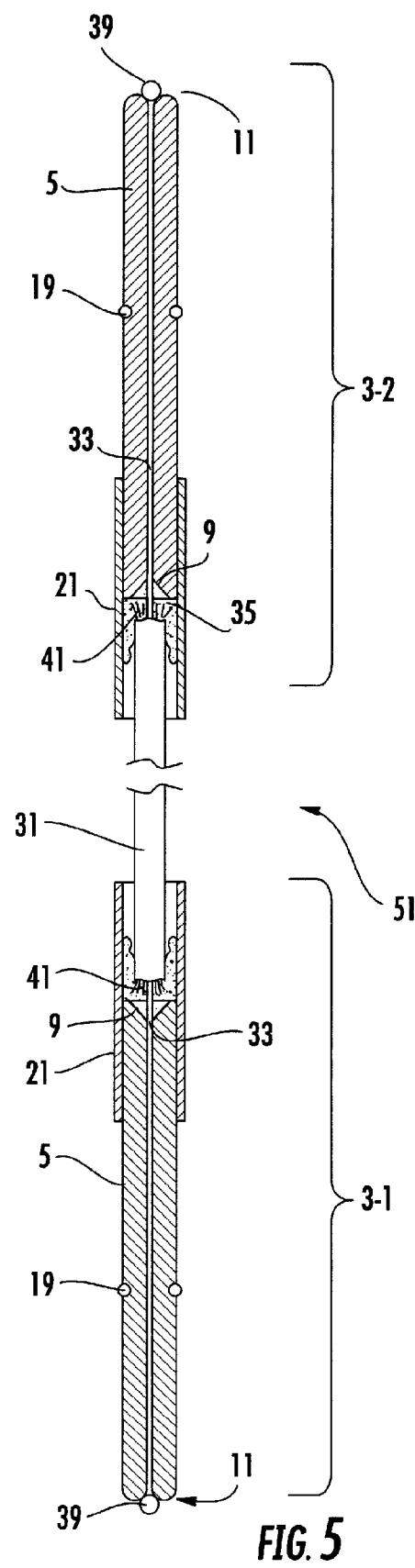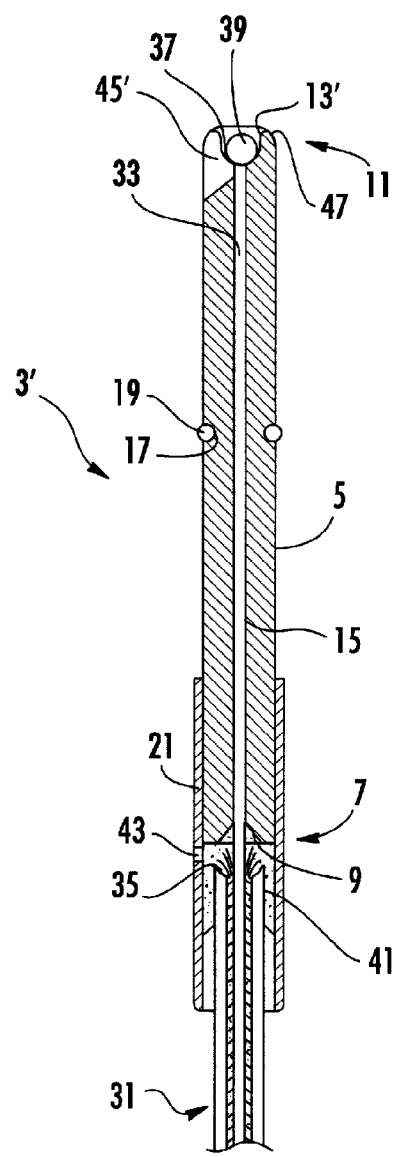
FIG. 5
FIG. 5A

EXPANDED BEAM CONNECTOR CONCEPTS

This application is a continuation of application Ser. No. 13/782,759, filed Mar. 1, 2013, which is a continuation-in-part of application Ser. No. 12/337,212, filed Dec. 17, 2008, which is a continuation-in-part of application Ser. No. 11/765,318, filed Jun. 19, 2007, which claims the benefit of U.S. Provisional Application No. 60/814,527, filed Jun. 19, 2006, the entire contents of the four prior applications are herein incorporated by reference.

BACKGROUND OF THE INVENTION

1. Field of the Invention

The present invention relates to fiber optic communications. More particularly, the present invention relates to a terminus to provide an orderly termination of a fiber optic cable, and to structures incorporating one or more of the termini, such as a connector, jumper, or attenuator.

2. Description of the Related Art

It is known in the background art, that a fiber optic cable may be cut and terminated for connection to a connector, jumper or attenuator, or other such structure. A typical termination includes a ferrule having a central bore passing through a center thereof. A length of optical fiber is exposed at the end of the cut fiber optic cable. The optical fiber is passed through the central bore in the ferrule and cut flush with the end of the ferrule. An epoxy secures the optical fiber within the central bore, and the cut end of the optical fiber is polished, along with the end of the ferrule, to finish the termination.

There was an appreciation in the background art that such a typical termination was unsuitable for use in harsh environments which are prone to vibration, such as in an aircraft. Since the optical fiber extended to the end of the ferrule and made physical contact with a receiving structure, the optical fiber was susceptible to damage (e.g. small stress cracks) when vibrated. U.S. Pat. No. 6,074,100, which is herein incorporated by reference, addressed this physical contact drawback associated with the typical termination.

FIGS. 17-21 illustrate the terminus of U.S. Pat. No. 6,074,100. In FIG. 17, the fiber optic cable 208 is stripped to remove and expose several sheaths of cable material. The stripped end of the fiber optic cable 208 includes a central optical fiber 212, a silicon buffer 214 disposed about the optical fiber 212, an inner jacket 216 enveloping the silicon buffer 214, a strengthening member 218 comprising a braided or woven fiber, e.g., a polyamide fiber such as Kevlar®, wrapped about the inner jacket 216, and an outer jacket 220 enveloping the strengthening member 218.

In FIG. 18, the stripped end of the fiber optic cable 208 is prepared for bonding to a ferrule assembly 222. The ferrule assembly 222 includes a rigid ferrule 224 and an aft body or sleeve 226 circumscribing and bonded to an end portion of the ferrule 224. More specifically, the rigid ferrule 224 defines an external face surface 228, a central bore 230 and an internal end 232, and the aft body 226 comprises a cylindrical inner bore 234 and a tapered end 236 defining a cylindrical outer surface 238. The ferrule 224 is fabricated from a ceramic, such as zirconia, and the aft body 226 is fabricated from stainless steel.

In preparation for bonding, a bead or ring of bonding adhesive 240 is applied to the outer surface 238 of the aft body 226, corresponding to region A, and a layer of bonding adhesive 242, corresponding to region B, is applied to the optical fiber 212 and inner jacket 214. The bonding adhesives 240, 242 in regions A and B are the same and, furthermore, are selected such that the Glass Transition Temperature ($T_G$) is greater than the maximum temperature anticipated in the operating environment of the terminus. Prior to bonding, the strengthening members 218 are folded rearwardly over the outer jacket 220. A shrink tubing 244, which will subsequently overlay the strengthening member 218, is used to temporarily preposition the strengthening member 218 over the outer jacket 220.

In FIG. 19, the stripped end of the fiber optic cable 208 is inserted within the ferrule assembly 222 such that the optical fiber 212 passes through the ferrule bore 230 and the inner jacket 214 abuts the internal end 232 of the ferrule 224. Next, the shrink tubing 244 is slid rearwardly (shown in phantom) to release the strengthening member 218 which is then folded over the cylindrical outer surface 238 of the aft body 226. As such, the ring of bonding adhesive 240 in region A contacts and impregnates the strengthening member 218. The shrink tubing 244 is then moved forwardly such that it overlays the strengthening member 218 and the outer jacket 220. During a curing process, the adhesive 240 is solidified and the shrink tube 244 contracts. After the curing process, the end of the optical fiber 212 is cleaved in close proximity to the external face surface 228 of the ferrule 224, as illustrated in FIG. 19.

Then, various sanding or polishing operations are preformed in order to recess the cut end of the optical fiber 212 below the external face surface 228 of the ferrule 224, as illustrated in FIGS. 20 and 21. Specifically, the end profile 250 is characterized by the optical fiber 212 defining an end surface 252 which is recessed or undercut relative to the face surface 228 of the ferrule 224 (as best shown in FIG. 20). The end surface of the optical fiber 212 is at least the combination of the light-carrying core $212_{CO}$ and its surrounding cladding $212_{CL}$.

By the arrangement of FIGS. 17-21, U.S. Pat. No. 6,074,100 provides a fiber optic cable termination more suitable for use in a demanding operational environment prone to vibration. By recessing the optical fiber termination 252 to a point within the ferrule end 228, the optical fiber was no longer in direct physical contact with a light transmission/reception structure (e.g., another optical fiber end or detector lens) and hence was less susceptible to damage (e.g., cracks in the optical fiber).

SUMMARY OF THE INVENTION

The Applicants have appreciated drawbacks in the terminus of the prior art.

With a physical contact (PC) connector, if a technician unintentionally snags the cordage entering the PC connector while working with tools, the ferrule holding the optical fiber can slightly retract into the connector body against a spring bias. If the ferrule retracts more than ½ of a wavelength of the signal, the signal connection will be lost. In ships, airplanes, submarines, etc., loss of the signal can be a trigger to reset computer equipment or to proceed to an emergency program. Either circumstance can be dangerous.

Also with prior art PC connectors, the connection is highly susceptible to dirt and dust. The presence of dirt and/or dust in the vicinity of the optical fiber of the ferrule can cause the connector to fail. For example, a small particle of debris can easily obstruct the light path which may be as small as eight microns in diameter.

Applicants have also appreciated that having several different terminus structures for different type end structures (e.g., connectors, jumpers, attenuators) is inefficient. Such arrangements of the background art require designing, tooling and inventorying many different parts. Moreover, technicians must be trained to install several different types of terminus and must carry different types of specialty tools for differently structured termini.

Also, Applicants have appreciated that many of the termini of the background art are difficult to install at the end of the fiber optic cable, insecure in their attachment to the end of the cable, and insecure in their attachment to the end structure (e.g., connector, jumper) and exhibit variable performance characteristics (e.g., dB losses at the terminus are widely inconsistent as installed and can change with vibration of the terminus).

The present invention addresses one or more of the drawbacks of the prior art.

These and other objects are accomplished by a terminus for a fiber optic cable including a ferrule. In one embodiment, an optical fiber of the cable passes through a central bore of the ferrule and is attached to a lens seated in a conical or cylindrical seat formed in an end surface of the ferrule by an epoxy. In a second embodiment, an optical fiber of the cable passes through the central bore of the ferrule. Next, a cap sleeve with a lens therein is slid over and attached to the ferrule such that the lens abuts or is attached to the optical fiber. In either embodiment, an inspection slot may optionally be formed in the ferrule and/or the cap sleeve to allow a technician to inspect the state of the attachment and/or abutment and/or spacing of the optical fiber and the lens.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 5 is a cross sectional view illustrating a jumper formed by a length of fiber optic cable with ferrules, as depicted in FIG. 1, attached at each end;

FIG. 5A is a cross sectional view similar to FIG. 1, but illustrating an alternative design for the first embodiment of the terminus;

DETAILED DESCRIPTION OF EMBODIMENTS OF THE INVENTION

Figure 1:
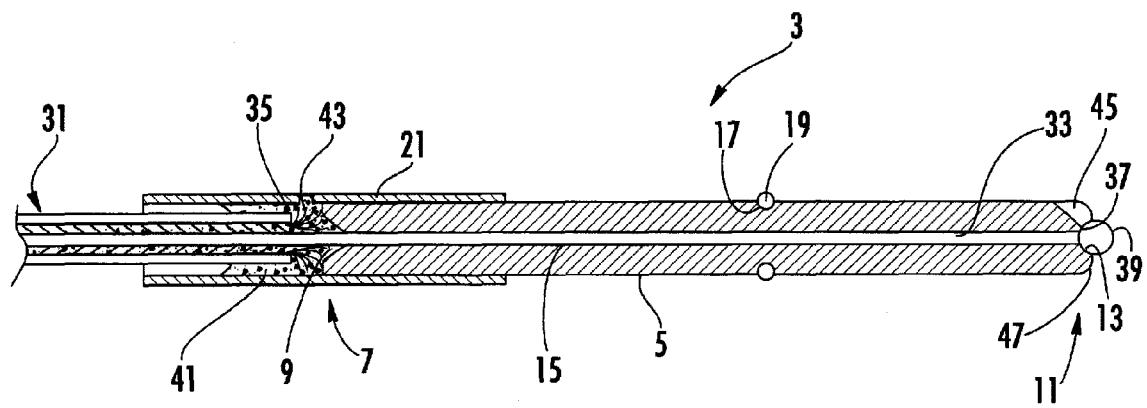
FIG. 1 is a cross sectional side view of a terminus in accordance with a first embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 is a cross sectional side view of a terminus 3 in accordance with the present invention. The terminus 3 includes a ferrule 5. The ferrule 5 is generally cylindrical in shape, made of ceramic (e.g., zirconia, glass, alumina), and has an outside diameter of 1.25 mm. Of course, other shapes, sizes and materials (such as a metal, a polymer or a composite material) may be selected for the ferrule 5.

A first end 7 of the ferrule 5 includes a first conical entrance 9. A second end 11 of the ferrule 5 includes a second conical entrance 13. Although a conical shape is illustrated, the shape could be cylindrical or any other type of shape resulting from a counter bore within the second end 11 of the ferrule 5. The first and second conical entrances 9 and 13 are generally centered in the first and second ends 7 and 11, respectively. A bore 15 passes through the center of the ferrule 5 from a center of the first conical entrance 9 to a center of the second conical entrance 13.

A retaining feature, such as a narrow ring or trench 17 may be cut into an outer surface of the ferrule 5 to encircle the outer surface of the ferrule 5. A retainer ring 19 removably resides within the trench 17. The retainer ring 19 may be formed of metal, a polymer or a composite. In preferred embodiments, the retainer ring 19 is a spring clip or a rubber O-ring. The retainer ring 19 plays a role in attaching the terminus 3 to other structures (e.g. a connector, a jumper), and may be located at other locations on the ferrule 5. An alternative, differently structured retaining feature is described in relation to FIG. 5B below.

Figure 2:
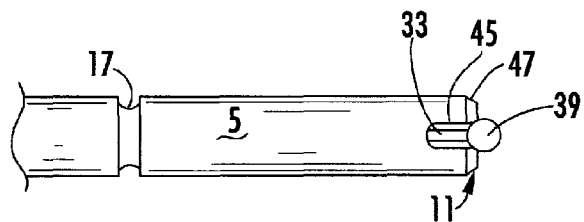
FIG. 2 is a top view illustrating an end portion of the ferrule of FIG. 1.
Figure 3:
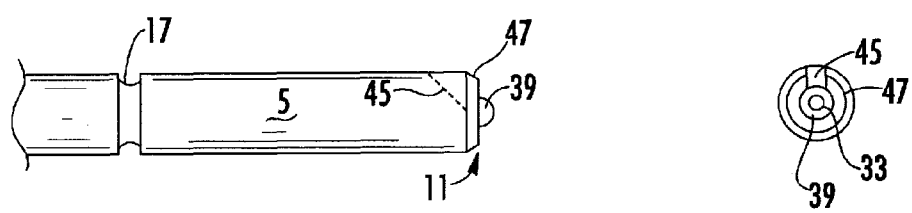
FIG. 3 is a side view, illustrating the end portion of the ferrule of FIG. 1.
Figure 4:
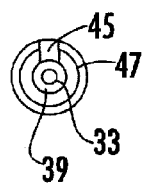
FIG. 4 is an end view of the ferrule of FIG. 1.

The second end 11 of the ferrule 5 includes an inspection slot 45 and a chamfer 47, as best seen in FIGS. 2-4. The inspection slot 45 is a cutout in the material of the ferrule 5, which passes down to the bore 15. The inspection slot 45 may be formed with a diamond saw blade or by other means. The function of the inspection slot 45 will be described below.

The terminus 3 also includes a retaining sleeve 21. The retaining sleeve 21 is generally cylindrical in shape, made of metal (such as stainless steel), and has an inner diameter approximately equal to or slightly greater than 1.25 mm (i.e. slightly greater than the outer diameter of the ferrule 5). Of course, the retaining sleeve 21 could be made of other materials, such as ceramic, polymer or composite materials. Also, the retaining sleeve 21 could be differently shaped and sized, so long as the ferrule 5 could be registered into the retaining sleeve 21, as illustrated in FIG. 1.

Now, a use of the terminus 3 in conjunction with a fiber optic cable or cordage 31 will be described. First, the cordage 31 is passed through the retaining sleeve 21. Next, an outer layer of the cordage 31 is removed to expose a section of the light carrying fiber 33 (approximately as long as the ferrule 5) and a short section of the cable strength members, e.g., KEVLAR fibers 35, which surround the light carrying optical fiber 33 (as depicted in FIG. 1).

The light carrying optical fiber 33 is inserted into the bore 15 at the first end 7 of the ferrule 5 using the first conical entrance 9 as a guide. The optical fiber 33 is passed through the bore 15 to the second end 11 of the ferrule 5 and stops at the second conical entrance 13.

An optical epoxy 37 is applied to the end of the optical fiber 33 and inside the second conical entrance 13. A lens 39 is seated into the second conical entrance 13, such that the optical epoxy 37 adheres the lens 39 to the optical fiber 33 and the second conical entrance 13. In a preferred embodiment, the lens 39 is spherical in shape with a diameter of about 100 to 3,000 um (e.g., 125 um, 300 um, 500 um, 750 um, 1,250 um 2,500 um), is formed of sapphire, and has an antireflective coating. However, other types and sizes of lens may be employed. For example, the lens 39 could have other shapes such as a barrel, plano-convex or aspherical; the lens 39 could be formed of other materials like optical glass, cubic zirconia, quartz, or quartz-like materials; and the lens 39 could be uncoated.

The index of refraction of the optical fiber 33 is typically 1.46 to 1.49 (e.g., less than approximately 1.5). However, it is envisioned that the optical fiber could have an index of refraction which slightly higher, such as an index of refraction which is less than 1.6. The index of refraction for the lens 39 will be set greater than 1.5, and usually greater than 1.6. Desirably, the index of refraction of the lens 39 is greater than the index of refraction of the optical fiber 33. For example, if the index of refraction of the optic fiber 33 is less than 1.6, the index of refraction of the lens 39 is greater than 1.6. As another example, if the index of refraction of the lens 39 is greater than 1.5, the index of refraction of the optical fiber 33 is less than 1.5.

The optical epoxy 37 preferably has optical characteristics matching or close to the optical characteristics of the optical fiber 33 and/or the lens 39. More preferably, the optical epoxy 37 has an index of refraction value (e.g. 1.57) which is between the index of refraction value (e.g. 1.46 to 1.49) of the optical fiber 33 and the index of refraction value (e.g. 1.7) of the lens 39. For example, the epoxy 37 could have an index of refraction value between about 1.4 and 1.8.

The retaining sleeve 21 is slid over the cordage 31 to cover the junction between the cordage 31 and the ferrule 5. Additional epoxy or another type of adhesive 41 is inserted into the junction area where the cordage 31 meets the ferrule 5. The adhesive 41 is illustrated with dots in FIG. 1 and need not have any particular optical characteristics. The adhesive 41 may be inserted into this area using a syringe through the end of the retaining sleeve 21, which does not possess the ferrule 5. Alternatively, the syringe may be inserted through a hole 43 in a sidewall of the retaining sleeve 21. The adhesive 41 adheres to the KEVLAR fibers 35, the end of the cordage 31, the retaining sleeve 21, the optical fiber 33, and/or the first end 7 of the ferrule 5. EPOTEC 353ND and HYSOL 151 by Locktite work well.

Lastly, the technician may use a scope to peer through the inspection slot 45 to view the status of the epoxy 37 and the connection of the lens 39 to the optical fiber 33 and the second end 11 of the ferrule 5. The technician may add epoxy 37 and/or position the end of the optical fiber 33 a preferred distance from lens 39 while viewing the gap through inspection slot 45

FIG. 2 is a top view illustrating approximately one half of the ferrule 5 adjacent to the second end 11. FIG. 3 is a side view, similar to FIG. 1 but not in cross section, illustrating approximately one half of the ferrule 5 adjacent to the second end 11. FIG. 4 is an end view of the second end 11 of the ferrule 5.

FIG. 5 demonstrates how a first terminus 3-1 may be connected to an identically constructed second terminus 3-2 to configure a jumper 51. As can be seen in FIG. 5, a select length of cordage 31 may be cut, e.g. 3 inches, 6 inches, 30 cm, 500 meters. The first terminus 3-1 is attached to one end of the cordage 31 and the second terminus 3-2 is attached to the other end of the cordage 31. In FIG. 5, the first terminus 3-1 and the second terminus 3-2 are illustrated in cross section, whereas the cordage 31 is illustrated in a side view, without cross section, to simplify the drawing.

The jumper 51 can be used to independently replace channels of a multi-channel connector, as will be described hereinafter. In so doing, the jumper 51 can minimize repair costs.

FIG. 5A is a cross sectional view similar to FIG. 1, but illustrating an alternative design for the terminus 3. In FIG. 5A, the alternative terminus 3' includes many identical parts as compared to the terminus 3, and such identical parts are identified by the same reference numerals. The primary distinction of alternative terminus 3' is that the second conical entrance 13' extends further into the ferrule 5, such that the lens 39 is recessed into the second end 11 of the ferrule 5. Also, the inspection slot 45' has been extended further back into the ferrule 5.

Figure 5B:
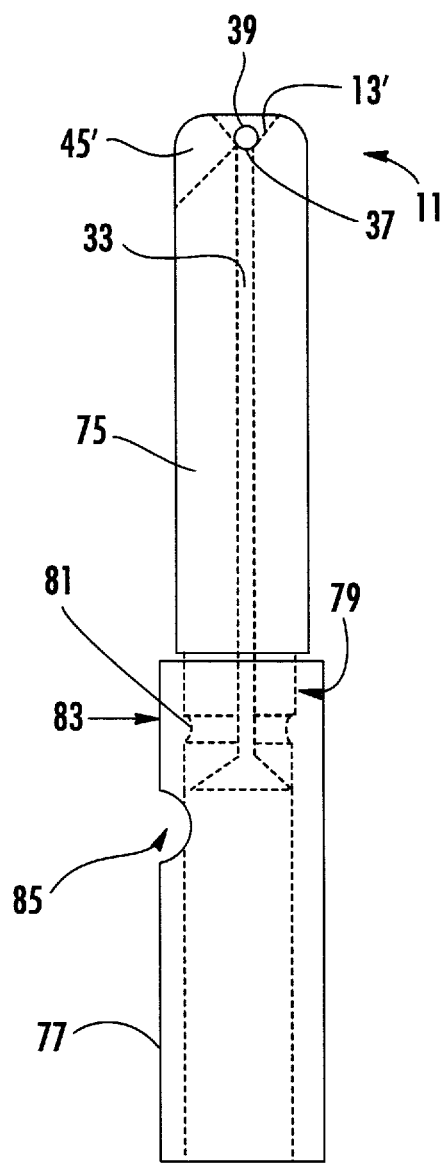
FIG. 5B is a side view similar to FIG. 3, but illustrating yet another alternative design for the first embodiment of the terminus with alternative retaining features.

In an alternative embodiment depicted in FIG. 5B, retaining features 17 and 19 have been replaced by a dual purpose retaining sleeve 77. The retaining sleeve 77 serves the same purpose as the retaining sleeve 21 in FIG. 5A and also serves the purposes of providing a connecting feature for interaction with other objects (e.g., connector envelopes).

The ferrule 75 has a reduced diameter portion 79 to receive the retaining sleeve 77. The reduced diameter portion 79 includes a perimeter groove 81. The retaining sleeve 77 may be attached to the ferrule 75 by applying a series of crimps, or a continuous crimp, along a perimeter of the retaining sleeve 77 generally located beneath arrow 83. The retaining sleeve 77 may also be attached to the ferrule 75 by epoxy and/or by pressing the two members together, wherein a frictional attachment occurs due to the size of the inner diameter of the retaining sleeve 77 being approximately the same as the outer diameter of the reduced diameter portion 79 of the ferrule 75, e.g., an interference fit.

For connections to other objects (e.g. connector envelopes), the retaining sleeve 77 could include a protruding or recessed feature on its outer surface, such as the depicted cutout 85. The cutout 85 would allow a technician to insert or inspect epoxy at the rear of the ferrule 75, if desired. The cutout 85 could also be engaged by other fixing devices of secondary structures. For example, a crimp or pin in a secondary structure could protrude into the cutout 85 to fix the terminus of FIG. 5B to the secondary structure.

Figure 6:
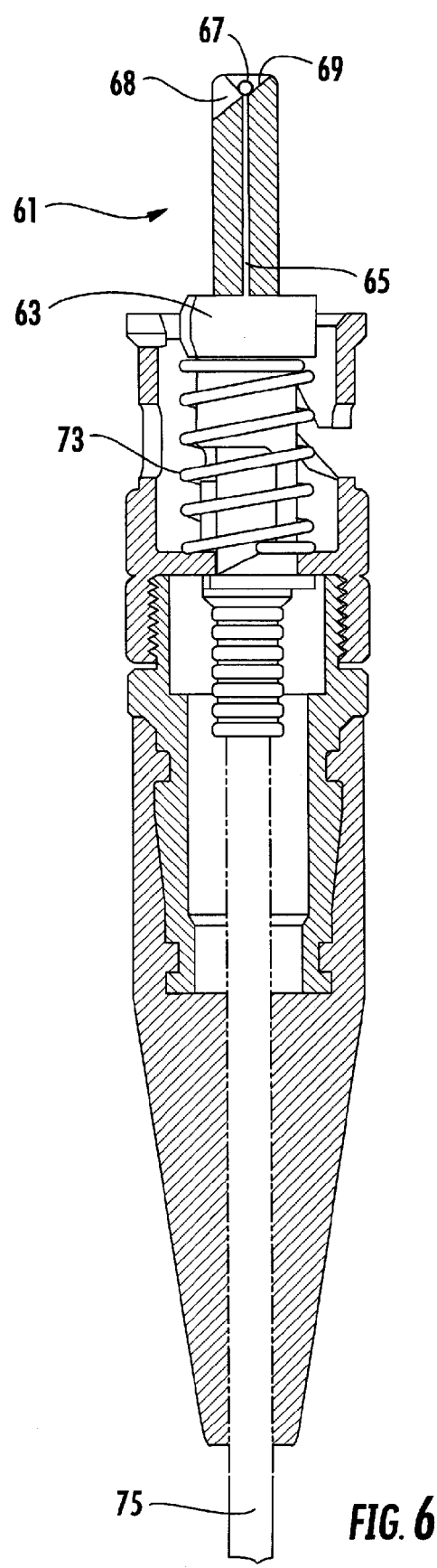
FIG. 6 is a cross sectional side view of an ST fiber optic connector including a terminus in accordance with FIG. 5A.

The recessed nature of the lenses 39 in FIGS. 5A and 5B will protect the lens 39 in physical contact (PC) type connectors, and will essentially convert a PC type connector into an expanded beam connector as will be seen in relation in FIG. 6. In a PC-type connector, the light carrying optical fiber passes through and completely to the end of the ferrule or other holding structure. The end of the ferrule is in physical contact with another ferrule (or structure for transmitting/receiving light) having a polished end with an optic fiber terminating in its end. The Applicants have appreciated drawbacks in the PC connectors of the background art.

The PC connector is very susceptible to communication errors in harsh environments. Since the diameter of the light transmission path between the ferrules of mating connectors is very small, any dust or debris in this location will severely attenuate the signal strength. Also, the aspect of physical contact is very troublesome when vibrations are present. The vibration leads to wear, scratches and damage to the optic fiber ends. The wear changes the performance characteristics of the connector over time. Further, the wear can lead to misalignments in the connector and signal transmission failure.

U.S. Pat. No. 6,074,100 discussed in the background art section herein addressed one of these drawbacks by recessing the optical fiber end back from the end surface of the ferrule. However, the present invention also converts the connector into an expanded beam connector by virtue of the lens 39, which even further improves the performance of a PC connector in a harsh environment, as will be detailed hereinafter. To this end, the present invention provides expanded beam connectors with physical dimensions and feature locations (i.e. the envelope of the connector) to replace standardized PC connectors.

FIG. 6 illustrates a standard ST type connector envelope with the expanded beam features of the present invention.

Specifically, the physical contact ferrule assembly of the background art has been removed. In its place, Applicants have inserted an expanded beam ferrule assembly 61 (which may be constructed the same as, or similar to, the ferrule 3' of FIG. 5A or ferrule 75 FIG. 5B). The expanded beam ferrule assembly 61 may include the retainer ring 19, as illustrated in FIG. 5A in order to attach the ferrule assembly 61 to a collar 63 of the ST connector. Alternatively, the collar 63 may be press fit onto the stainless steel sleeve 77 of the ferrule assembly of FIG. 5B, or adhered thereto by epoxy, or by any other fixing manner. Alternatively, the expanded beam ferrules 5 or 75 may be pressed, or attached by an epoxy, directly into the collar 63, without any need for retaining features 17 and 19 and/or any need for a retaining sleeve 21 or 77.

As seen in FIG. 6, the ferrule assembly 61 has a central bore through which a light carrying optical fiber 65 passes. A lens 67 is positioned within a conical recess 69 in the face of the ferrule assembly 61. An index matching epoxy fixes the lens 67 to the optical fiber 65 and the conical recess 69. The connections between the optical fiber 65, conical recess 69 and lens 67 may be inspected via the inspection slot 68.

As can be seen in FIG. 6, the lens 67 is recessed into the ferrule assembly 61, via the conical recess 69, by a distance greater than the diameter of the lens 67. Therefore, the lens 67 is protected in the end of the ferrule assembly 61, i.e. a planar object in contact with the end of the ferrule assembly 61 will not come into physical contact with the lens 67.

Applicants have discovered that the expanded beam ST connector has many advantages over the PC ST connector. The lens 67 widens the light path to about three times the diameter of the optical fiber 65 and larger lens can be employed to widen the light path even greater than about three times the diameter of the optical fiber 65. This is particularly advantage in high vibration environments, which generate dust and debris. For example, with the connector of U.S. Pat. No. 6,074,100 physical contact exists between the ferrule and the transmitting/receiving structure. If vibration causes wear on the interface, the wear can generate dust within the connector. If a piece of dust or dirt having a cross sectional area equal to half the end surface area of the optic fiber 65 were to be in the center of a PC ferrule of the background art, that piece of dirt could block about 50% of the light passing through the connector. Most likely, the PC ST connector would fail under that circumstance. If that same sized piece of dirt were to be in the center of the expanded beam ferrule assembly 61 of the present invention, it would block about 11% of the light passing through the connector. Most likely the expanded beam ST connector would continue to function.

Also, in the PC ST connector of the background art, direct physical contact of the optical fiber at the end of the ferrule is troublesome. Vibration in the connector leads to wear, scratches and damage to the optical fiber end. The wear changes the performance characteristics of the connector over time. The expanded beam ST connector of the present invention does not suffer this drawback. The lens 67 does not come into direct contact with another object. Rather, there is an optimum spacing for the lens 67 from a detector lens or optical fiber. The optimum spacing is preferably 5 to $^{100}/_{1000}$ of an inch to achieve minimum signal attenuation. However, this spacing will vary depending upon the material, coatings, size and shape of the lens 67. Having the light transmitting and receiving features separated by a gap insulates them from wear concerns and helps to keep the performance characteristics of the expanded beam ST connector constant over time.

Also, the expanded beam ST connector is less susceptible to unintentional disconnects. In the PC ST connector, if a technician unintentionally snags the cordage 75 entering the PC ST connector while working with tools, or a shock wave strikes the connector or device, the PC ferrule can slightly retract into the connector envelope against the bias of the spring 73 encircling the collar 63. If the PC ferrule retracts more than ½ of a wavelength of the signal, the signal connection will be lost. In ships, airplanes, submarines, etc., loss of the signal can be a trigger to reset computer equipment or to proceed to an emergency program. Either circumstance can be dangerous.

In the expanded beam ST connector of the present invention, physical contact along the light path in the connector is not required. Rather, a gap is purposefully present. Moreover, due to the lens 67 the gap may be expanded greatly without loosing the signal connection through the connector. For example, if the cordage of the expanded beam ST connector is snagged by a technician the expanded beam ferrule assembly 61 could be retracted approximately 1,000 times further into the collar 63, as compared to the PC ferrule of the PC ST connector, without disconnecting the signal connection, assuming the collar 63 would even permit such a retraction length.

Figure 7:
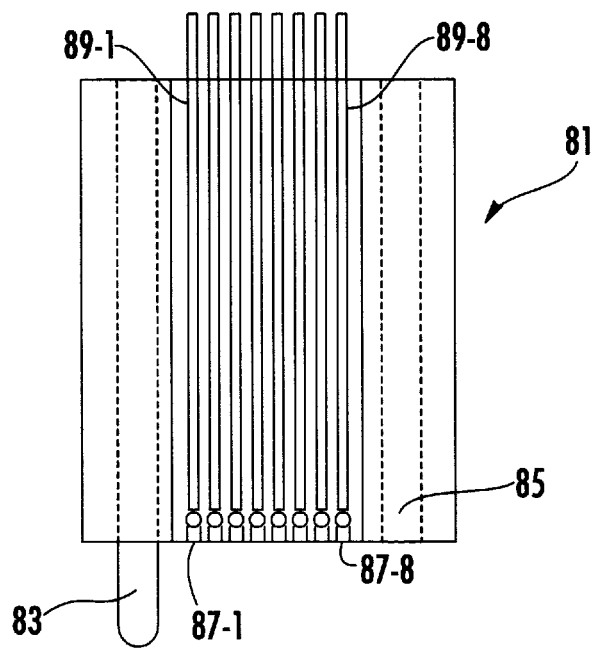
FIG. 7 is a top view of a first embodiment of an MT connector including a plurality of termini in accordance with the first embodiment of the present invention.

FIG. 7 includes a top view and an end view of an expanded beam MT type connector, in accordance with the present invention. The MT type connector is generally block shaped and typically has dimensions on the order of ⅜"× ⅛"×⅜". The MT physical contact (PC) connector of the background art has two to twelve channels, such as eight channels. If one channel breaks or is damaged, the entire MT PC connector of the background art is replaced. Applicants appreciated that this was wasteful.

Figure 7A:
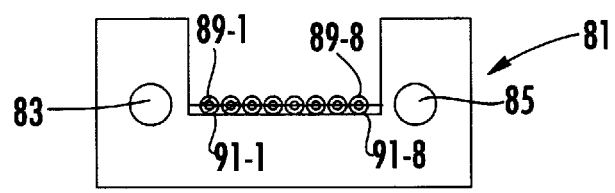
FIG. 7A is an end view of the MT connector of FIG. 7.

Therefore, Applicants have devised an expanded beam MT connector which has all of the advantages mention above in connection with expanded beam ferrules over PC ferrules. FIG. 7 is a top view of the expanded beam MT connector 81, whereas FIG. 7A is a connector end view of the expanded beam MT connector 81.

The expanded beam MT connector can have individual channels repaired by a technician. For instance, an optic fiber extending from the fiber optic cable to a defective channel within the MT connector 81 could be cut and a new terminus installed onto the cut optical fiber on the fiber optic cable side. The defective terminus within the MT connector 81 could be removed and if sufficient fiber optic cable length were present, the newly installed terminus could be plugged into the vacated position in the MT connector 81 where the defective terminus was removed. If insufficient fiber optic cable length exists, the repair could be facilitated using a jumper 51, as illustrated in FIG. 5.

As can be seen in FIG. 7, the expanded beam MT connector 81 has an alignment pin 83 and an alignment hole 85. A top of the MT connector 81 is open to exposed eight v-grooves 87-1 through 87-8. Eight termini 89-1 through 89-8 reside in the eight v-grooves 87-1 through 87-8. As best seen in FIG. 7A, the eight termini 89-1 through 89-8 present eight lenses 91-1 through 91-8 at a connection end of the MT connector 81. The lenses 91-1 through 91-8 are slightly recessed into the connection end of the MT connector 81 to protect the lenses 91-1 through 91-8 from wear.

Figure 8:
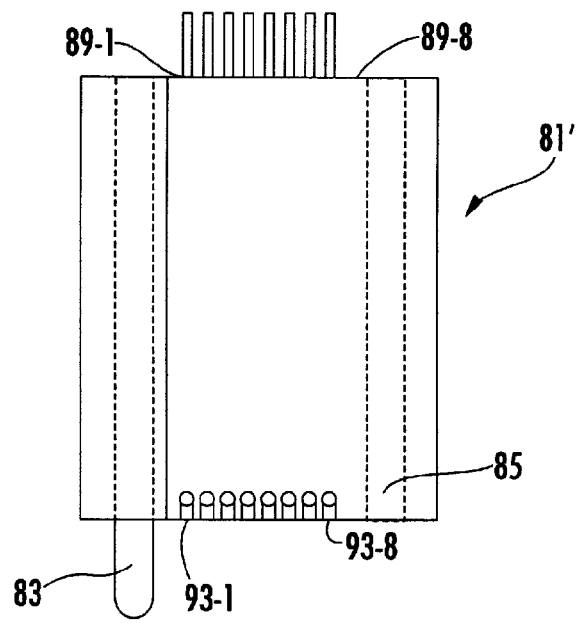
FIG. 8 is a top view of an alternative embodiment of an MT connector including a plurality of termini in accordance with the first embodiment of the present invention.
Figure 8A:
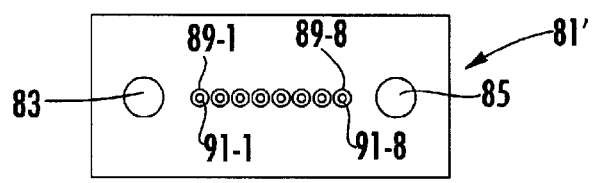
FIG. 8A is an end view of the MT connector of FIG. 8.

FIG. 8 is a top view of an alternative expanded beam MT type connector 81', in accordance with the present invention. FIG. 8A is a connector end view of the alternative expanded beam MT connector 81'. The alternative expanded beam MT type connector 81' does not have an open top, but rather includes bores 93-1 through 93-8. The termini 89-1 through 89-8 are located in the bores 93-1 through 93-8. The lenses 91-1 through 91-8 are slightly recessed into the connection end of the alternative MT connector 81' to protect the lenses 91-1 through 91-8 from wear.

Although FIGS. 7, 7A, 8 and 8A illustrated termini 89-1 through 89-8, it should be appreciated that several advantages of the present invention could also be obtained by simply fixing the cordage or optical fiber directly in the v-grooves 87-1 through 87-8 or in the bores 93-1 through 93-8. The cordage or optical fibers could be fixed by an epoxy. Such a modification would still have the recessed lenses 91-1 through 91-8 and would still enjoy the benefits of the improved immunity to dust and debris and the improved protection from wear; however the ability to replace an individual channel would be impaired.

Although FIGS. 6, 7, 7A, 8 and 8A have illustrated ST and MT type connector envelopes, it should be appreciated that the expanded beam ferrules of the present invention could be applied to other types of connector envelopes, such as LC, SC, FC, MU, ROC, 38999 or 29504 type connector envelopes.

Now with reference to FIGS. 9-16 a terminus 103 in accordance with a second general embodiment of the present invention will be described. The terminus 103 can be used as described above in relation to the terminus 3 (e.g., in connectors, jumpers, attenuators). The Applicants have discover that forming the second conical entrance 13 in the second end 11 of the ferrule 5, as depicted in FIG. 1, is often difficult. The dimensions of the second conical entrance 13 must be precise to have a properly aligned lens 39, and the common ceramic material of the ferrule 5 is difficult to machine to a high tolerance. Given batches of machined ferrules 5, which were examined, revealed ferrules 5 with well-formed second conical entrances 13 intermixed with ferrules 5 having second conical entrances 13, which are out of specifications. Therefore, each ferrule 5 must be inspected and out-of-tolerance ferrules 5 must be discarded/recycled.

Now with reference to FIGS. 9-16, a second embodiment of the expanded beam terminus 103 will be described. The second embodiment of the terminus 103 includes one or more of the advantages of the first embodiment of the terminus 3 described in relation to FIGS. 1-8A and is more easily fabricated to a high tolerance.

Figure 9:
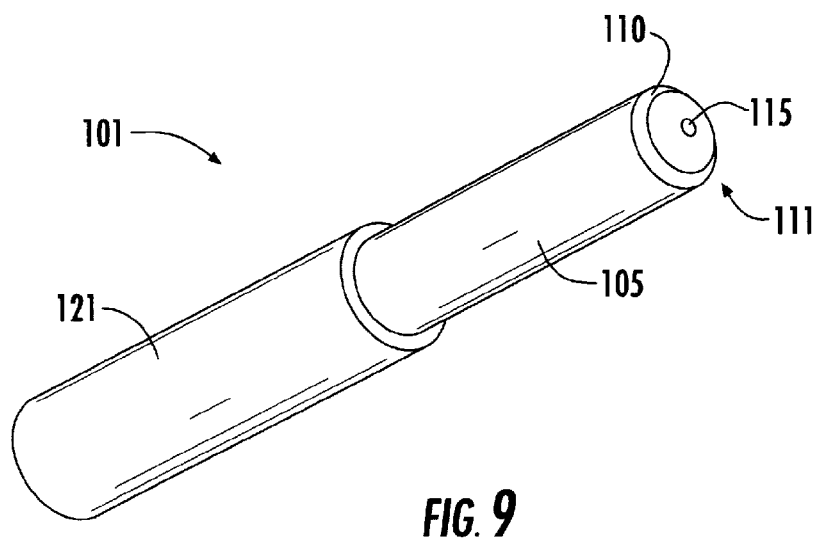
FIG. 9 is a perspective view of a ferrule and retaining sleeve for a terminus in accordance with a second embodiment of the present invention.
Figure 10:
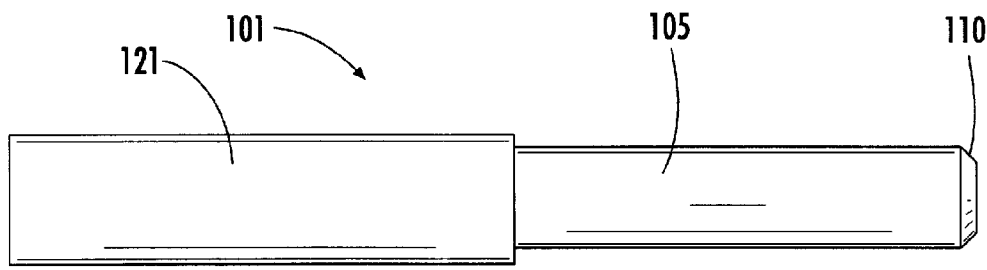
FIG. 10 is a side view of the ferrule and retaining sleeve of FIG. 9.
Figure 11:
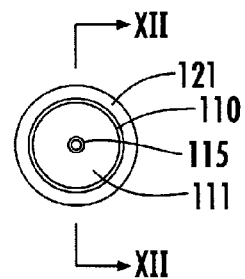
FIG. 11 is an end view of the ferrule and retaining sleeve of FIGS. 9 and 10.

FIG. 9 is a perspective view of a first part 101 of the terminus 103, in accordance with the second embodiment of the present invention. The first part 101 includes a ferrule 105. In a preferred embodiment, the ferrule 105 is a one-piece integral structure generally cylindrical in shape, made of ceramic (e.g., zirconia, glass, alumina), and has an outside diameter of 750 um. Of course, other shapes, sizes and materials (such as metal, polymer or composite materials) may be selected for the ferrule 105.

Figure 12:
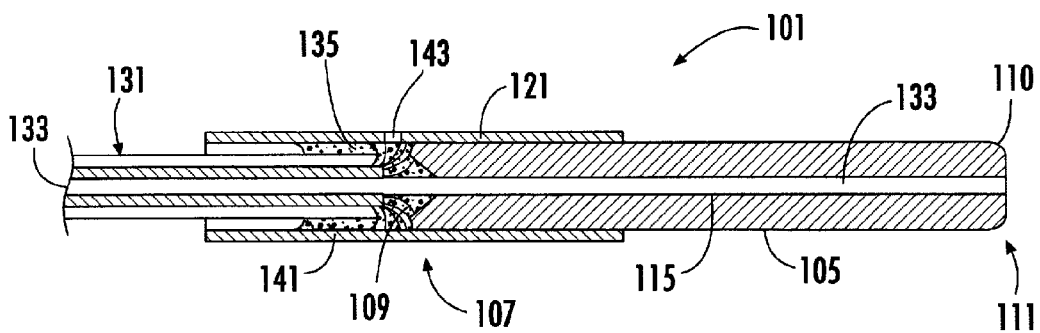
FIG. 12 is a cross sectional view taken along line XII-XII in FIG. 11.

As best seen in FIG. 12, a first end 107 of the ferrule 105 includes a conical entrance 109. The conical entrance 109 is generally centered in the first end 107. A second end 111 of the ferrule 105 is generally flat (i.e., may include a slightly radius after a final polishing process). The second end 111 of the ferrule 105 may optionally include a beveled edge 110 around its perimeter. A bore 115 passes through the center of the ferrule 105 from a center of the first conical entrance 109 to a center of the second end 111 of the ferrule 105.

The first part 101 of the terminus 103 also includes a retaining sleeve 121. The retaining sleeve 121 is generally cylindrical in shape, made of metal (such as stainless steel), and has an inner diameter approximately equal to or slightly less than 750 um (i.e., slightly less than the outer diameter of the ferrule 105 to create a pressure fit of the ferrule 105 within the retaining sleeve 121). Of course, the retaining sleeve 121 could be made of other materials, such as ceramic, polymer or composite materials. Also, the retaining sleeve 121 could be differently shaped and sized, so long as the ferrule 105 could be registered into the retaining sleeve 121, as illustrated in FIGS. 9-12.

Now, an assembly of the first part 101 of the terminus 103 to a fiber optic cable or cordage 131 will be described. It is envisioned that the assembly of the cordage 131 to the first part 101 of the terminus could be performed by a technician in the field, rather than in a factory. First, the cordage 131 is passed through the retaining sleeve 121. Next, an outer layer of the cordage 131 is removed to expose a section of the light carrying fiber 133 (approximately as long as the ferrule 105) and a short section of the cable strength members, e.g., KEVLAR fibers 135, which surround the light carrying optical fiber 133 (as depicted in FIG. 12).

Figure 18:
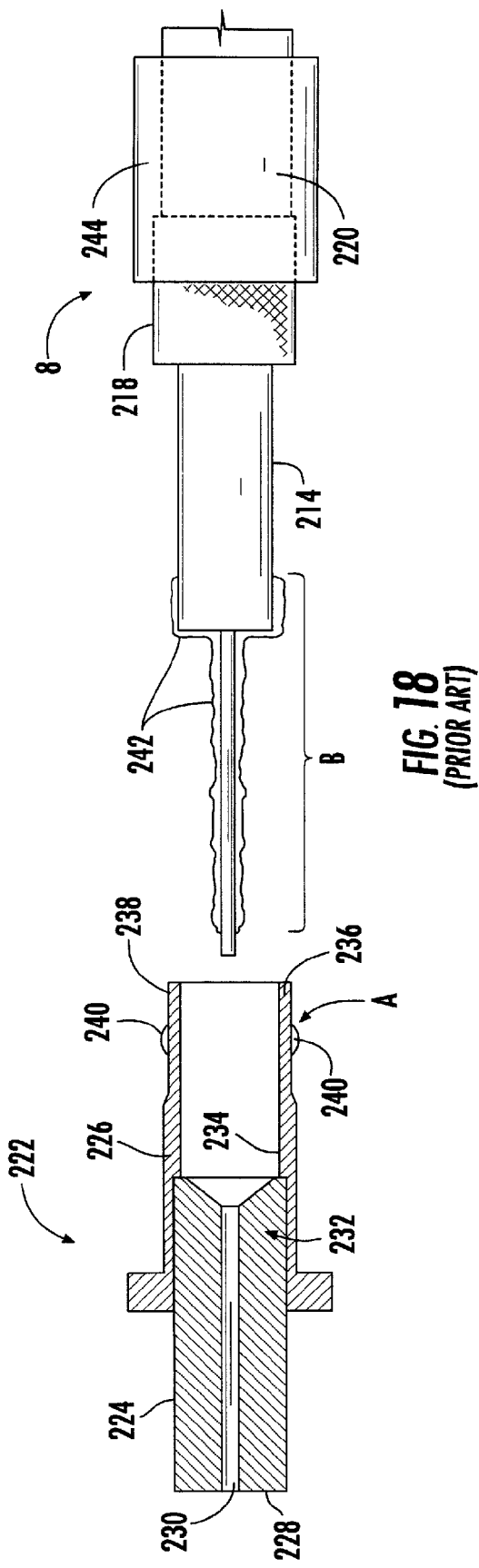
FIG. 18 is a side view, partially in cross section, illustrating the stripped end of FIG. 17 prepared for bonding to a ferrule assembly, in accordance with the prior art.
Figure 19:
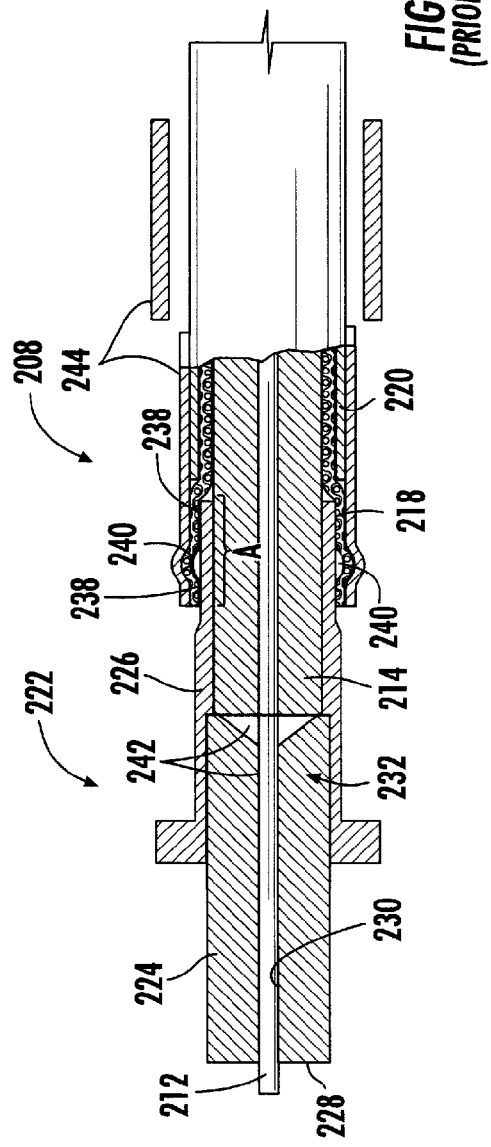
FIG. 19 illustrates the bonding of the stripped end to the ferrule assembly to form a terminus, in accordance with the prior art.
Figure 20:
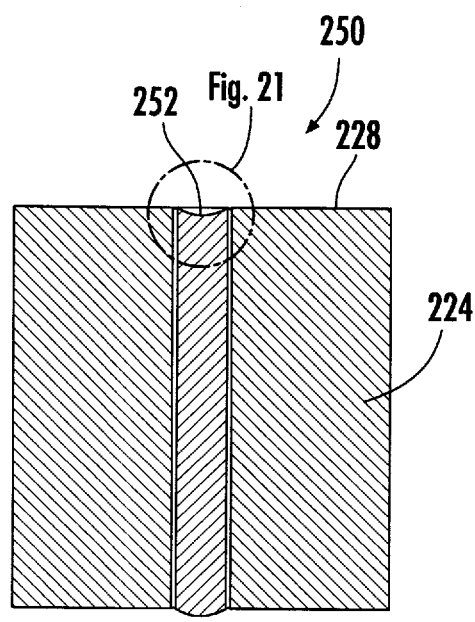
FIG. 20 is a cross sectional side view of the end of the terminus of FIG. 19 subsequent to a polishing operation.
Figure 21:
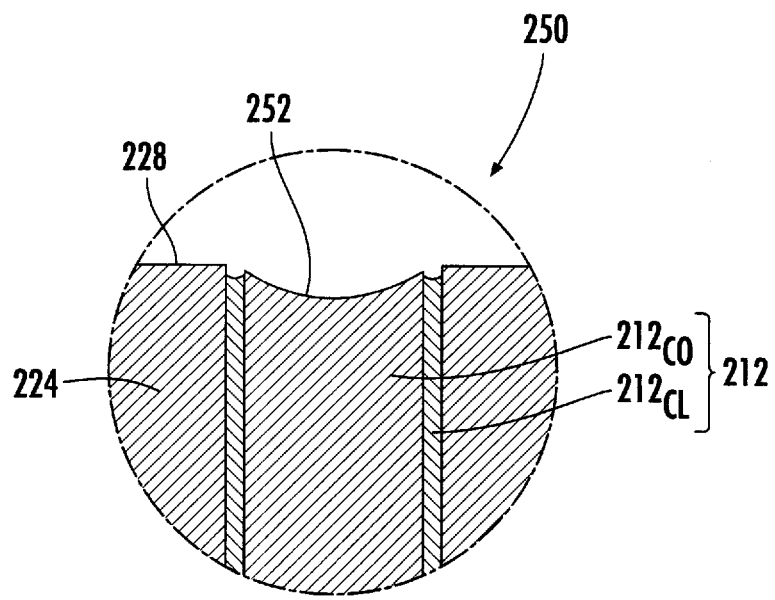
FIG. 21 is a cross sectional close-up view of the optical fiber at the end of the terminus of FIG. 20.

The light carrying optical fiber 133 is inserted into the bore 115 at the first end 107 of the ferrule 105 using the first conical entrance 109 as a guide. The optical fiber 133 is passed through the bore 115 to slightly extend out of the second end 111 of the ferrule 105. The optical fiber optical fiber 133 may be coated with an epoxy prior to being inserted into the bore 115, as described in conjunction with the prior art of FIG. 18. At the second end 111 of the ferrule 105, the optical fiber 133 is cut flush with the second end 111. Then, the optical fiber 133 and the second end 111 are polished, also in a traditional manner as known in the art.

The retaining sleeve 121 is slid over the cordage 131 to cover the junction between the cordage 131 and the ferrule 105. An epoxy or another type of adhesive 141 is inserted into the junction area where the cordage 131 meets the ferrule 105. The adhesive 141 is illustrated with dots in FIG. 12 and need not have any particular optical characteristics. The adhesive 141 may be inserted into this area using a syringe through the end of the retaining sleeve 121, which does not possess the ferrule 105. Alternatively or additionally, the syringe may be inserted through an optional hole 143 in a sidewall of the retaining sleeve 121. The adhesive 141 adheres to the KEVLAR fibers 135, the end of the cordage 131, the retaining sleeve 121, the optical fiber 133, and/or the first end 107 of the ferrule 105. EPOTEK 353ND and HYSOL 151 by Locktite work well.

Figure 13:
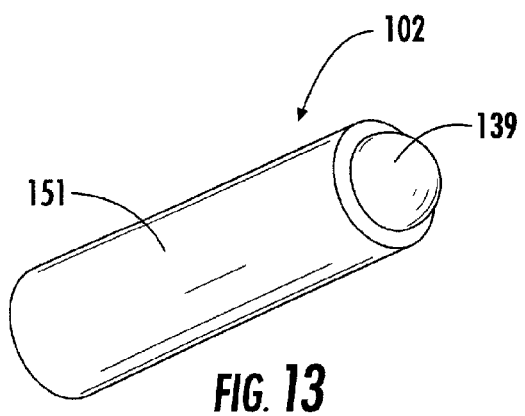
FIG. 13 is a perspective view of a cap sleeve for a terminus in accordance with the second embodiment of the present invention.
Figure 14:
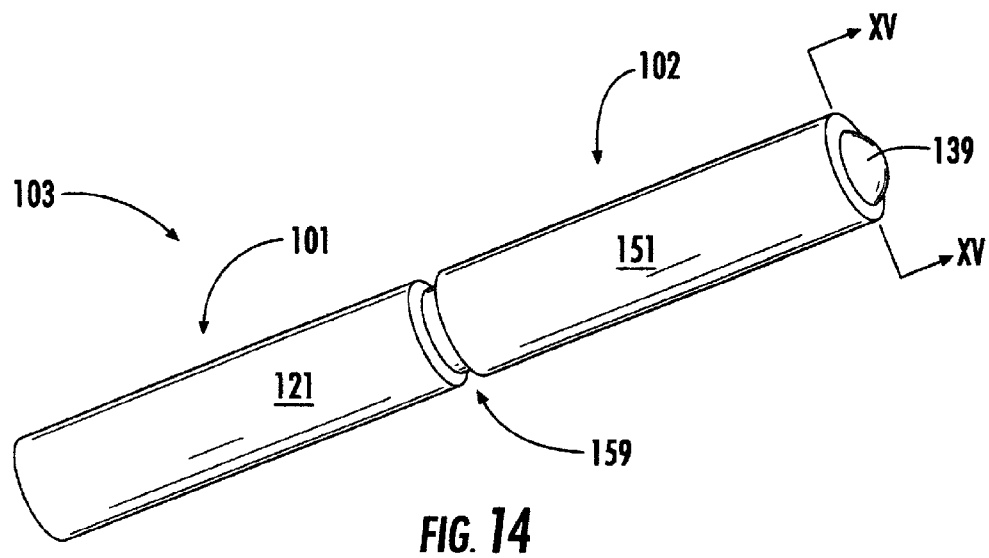
FIG. 14 is a perspective view of the cap sleeve of FIG. 13 slid over the ferrule of FIG. 9.
Figure 15:
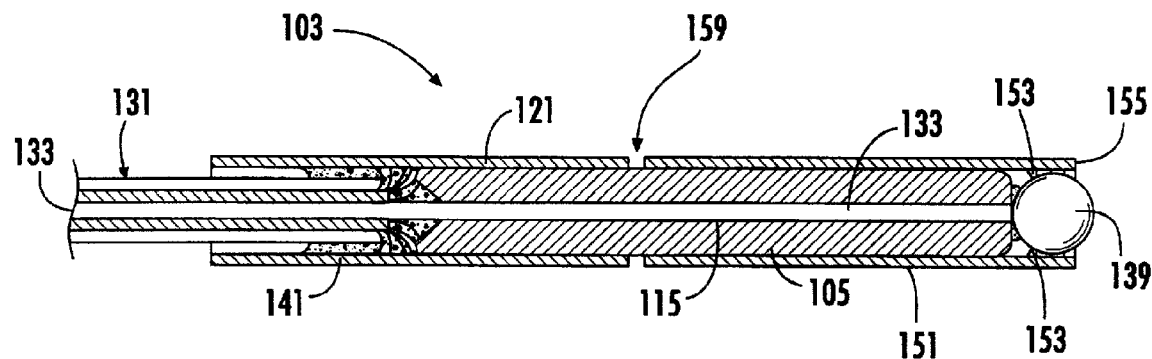
FIG. 15 is a cross sectional view taken along line XV-XV in FIG. 14.
Figure 16:
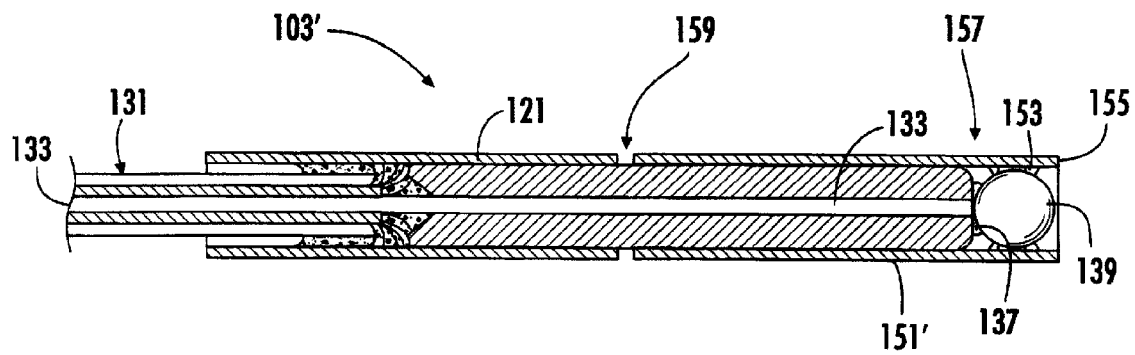
FIG. 16 is a cross sectional view similar to FIG. 15, but illustrating an alternative embodiment for the cap sleeve and mounting of a lens within the cap sleeve.
Figure 17:
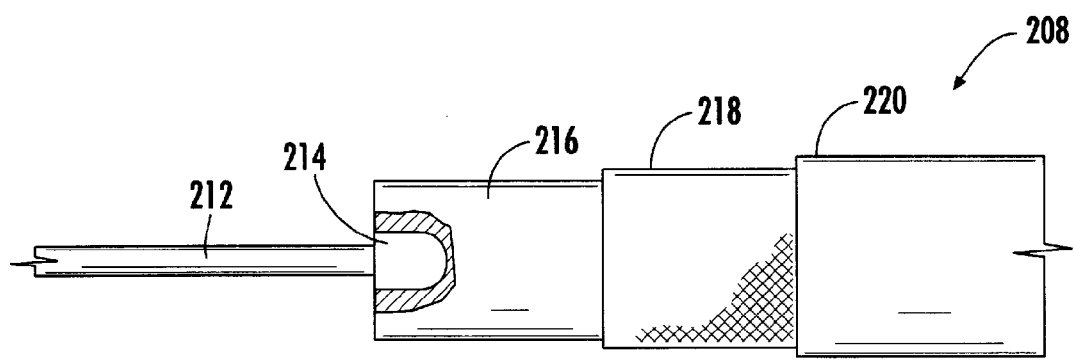
FIG. 17 is a side view, partially in cross section, illustrating an end of a fiber optic cable which has been stripped to reveal an optical fiber, in accordance with the prior art.

FIG. 13 is a perspective view of a second part 102 of the terminus 103, in accordance with the second embodiment of the present invention. The second part 102 includes a cap sleeve 151. In a preferred embodiment, the cap sleeve 151 is a one-piece integral structure in the shape of an open ended tubular cylinder or an open ended split cylinder (having a split along its sidewall from a first open end to a second open end which can slightly part or open to expand the inner diameter of the cap sleeve 151) and has an inner diameter approximately equal to or slightly greater (e.g., about one to two microns) than 750 um (i.e., slightly greater than the outer diameter of the ferrule 105). In a preferred embodiment, the cap sleeve 151 is made of ceramic (e.g. zirconia, glass, alumina), but the cap sleeve 151 could be made of other materials, such as metal, polymer or composite materials. Also, the cap sleeve 151 could be differently shaped and sized, so long as the ferrule 105 can be registered into the cap sleeve 151, as illustrated in FIGS. 14-16. In a preferred embodiment, the cap sleeve 151 directly contacts the ferrule 105 with no intervening structures residing therebetween.

Figure 15A:
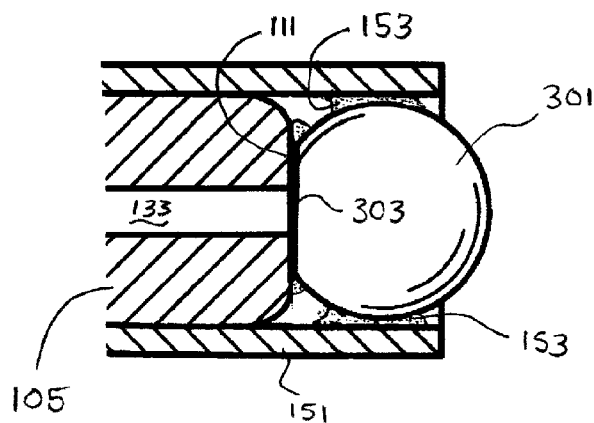
FIG. 15A is a close-up cross sectional view showing a lens in the shape of a sphere with a flat surface in the end of the cap sleeve.

The second part 102 of the terminus 103 also includes a lens 139. In a preferred embodiment, the lens 139 is spherical in shape with a diameter of about 100 to 3,000 um (e.g., 125 um, 300 um, 500 um, 750 um, 1,250 um 2,500 um), is formed of sapphire, and has an antireflective coating. However, other types and sizes of lens may be employed. For example, the lens 139 could have other shapes such as a sphere with a flat surface (See FIG. 15A), a barrel (See FIGS. 15B, 15C and 15D), a plano-convex type or an aspherical type; and the lens 139 could be formed of other materials like optical glass, cubic zirconia, quartz or quartz-like materials, or polyetherimide or similar polymer materials; and the lens 139 could be uncoated.

The index of refraction of the optical fiber 133 is typically 1.46 to 1.49 (e.g., less than approximately 1.5). However, it is envisioned that the optical fiber 133 could have an index of refraction which slightly higher, such as an index of refraction which is less than 1.6. The index of refraction for the lens 139 will be set greater than 1.5, and usually greater than 1.6. Desirably, the index of refraction of the lens 139 is greater than the index of refraction of the optical fiber 133. For example, if the index of refraction of the optic fiber 133 is less than 1.6, the index of refraction of the lens 139 is greater than 1.6. As another example, if the index of refraction of the lens 139 is greater than 1.5, the index of refraction of the optical fiber 133 is less than 1.5.

The lens 139 is attached within the cap sleeve 151 by an epoxy 153, as best illustrated in the cross sectional view of FIG. 15. The attachment between the lens 139 and the cap sleeve 151 may be accomplished in a factory setting, such that the assembled second part 102 of the terminus 103 could be supplied as a sub-assembly to the field technicians. By assembling the lens 139 within the cap sleeve 151 in a factory, a very precise location and firm attachment may be accomplished in a clean, controlled environment using guides and measuring instruments for verifications. Alternatively, the lens 139 may be integrally formed within the cap sleeve 151. In other words, the cap sleeve 151 and lens 139 may be formed as a unitary piece of an optical glass or optical grade polymer, such as polycarbonate, with the lens being molded and/or turned down directly in place within the cap sleeve 151.

The second part 102 of the terminus 103 would be carried by a field technician to a job site. After the first part 101 of the terminus is installed on the end of the optical fiber 133, as discussed in relation to FIGS. 9-12, the technician would "cap" the end of the ferrule 105 with the cap sleeve 151. To attach the cap sleeve 151 to the ferrule 105, an epoxy could be applied to the outer surfaces of the ferrule 105 and/or the inner surfaces of the cap sleeve 151 prior to placing the cap sleeve 151 over the second end 111 of the ferrule 105. A "capped" ferrule 105 would effectively convert the termination into an expanded beam termination having all of the benefits and advantages as described in relation to the first embodiment of the invention (FIGS. 1-8A).

FIG. 15 is a cross sectional view taken along line XV-XV in FIG. 14. As seen in FIGS. 14 and 15, the lens 139 slightly protrudes from an end face 155 of the cap sleeve 151. Also, the end of the optical fiber 133, which is flushed with the second end 111 of the ferrule 105 directly abuts the lens 139. In such a configuration, no optical epoxy need reside between the optical fiber 133 and lens 139 interface. As the lens 139 has a diameter which is several multiples larger than a diameter of a cylindrical shape of the optical fiber 133, the surfaces of the facing optical fiber and spherical lens begin to approximate parallel surfaces. For example, the spherical lens may have a diameter which is at least three times greater (and more preferably about four or more times greater) than a diameter of the optical fiber 133. By making the lens 139 so large relative to the optical fiber 133, spherical aberration problems with the lens 139 are reduced. This relative sizing between the lens 139 and the optical fiber 133 also apply to the first embodiment of FIG. 1.

As noted above, the lens 139 may be of a different type or shape. For example, in the close-up cross sectional view of FIG. 15A, a spherically shaped lens 301 has a flat surface 303 facing to the second end 111 of the ferrule 105. The flat surface 303 of the lens 301 would present a parallel surface to the end of the optical fiber 133. The lens 301 may be attached to the cap sleeve 151 by an epoxy 153.

Figure 15B:
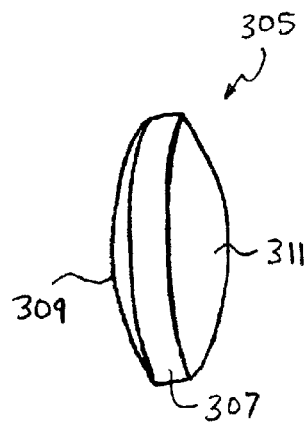
FIG. 15B is a perspective view of a barrel lens.

FIG. 15B is a perspective view of a barrel lens 305. The barrel lens 305 has a generally cylindrical mid-region 307 and includes a first convex surface 309 on a first end of the generally cylindrical mid region 307 and a second convex surface 311 on the opposite, second end of the generally cylindrical mid-region 307.

Figure 15C:
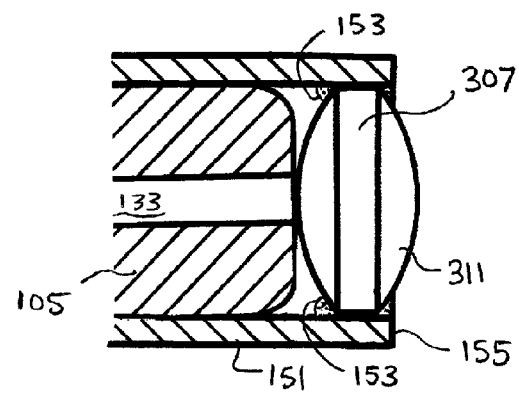
FIG. 15C is a close-up cross sectional view of the barrel lens in the end of the cap sleeve.

As best seen in FIG. 15C, the generally cylindrical mid-region 307 has a diameter which is approximately equal to, or slightly less than, an inner diameter of the cap sleeve 151. The barrel lens 305 may be attached to the cap sleeve 151 by an epoxy 153. As in FIG. 15C, a portion of the barrel lens 305, namely a portion of the second convex surface 311 protrudes past the end face 155 of the cap sleeve 151.

Figure 15D:
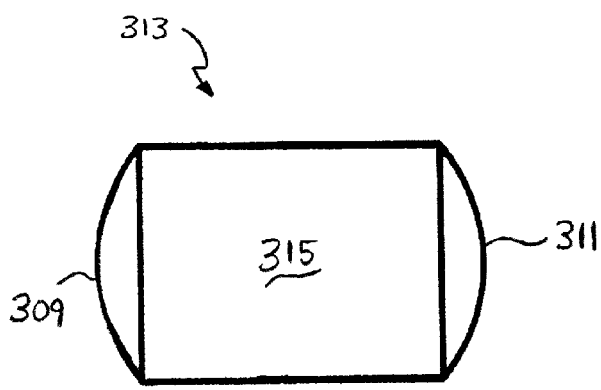
FIG. 15D is a side view of an extended length barrel lens.

FIG. 15D is a slide view of an alternative barrel lens 313. The alternative barrel lens 313 has an extended length, generally cylindrical mid region 315 located between the first convex surface 309 and the second convex surface 311. The extended length of the generally cylindrical mid region 315 can provide a more stable mounting of the alternative barrel lens 313 within the cap sleeve 151. As with the previous embodiments, the lens 301, 305 and 313 could be formed of sapphire or other materials like optical glass, cubic zirconia, quartz or quartz-like materials, or polyetherimide or similar polymer materials, and may include an antireflective coating or be uncoated.

Although FIG. 15 illustrates the end of the optical fiber 133, which is flushed with the second end 111 of the ferrule 105, directly abutting the lens 139, it may be desirable to space the end of the optical fiber 133 from the lens 139. The lens 139 will have a focal point determined by factors such as the index of refraction of the lens and the shape of the lens. In certain embodiments, where the focal point of the lens 139 is spaced from the outer physical edge of the lens 139, it may be desirable to locate the end of the optical fiber 133 at the focal point of the lens 139, i.e., a certain distance from the lens 139. The gap between the end of the optical fiber 133 and the lens 139 may be an air gap or filled by optical epoxy, as more fully explained in relation to FIG. 16 below.

FIG. 16 shows an alternative cap sleeve 151'. The alternative cap sleeve 151' is slightly longer that the cap sleeve 151 of FIG. 15. By this arrangement, the lens 139 is slightly recessed into the cap sleeve 151' and does not protrude past the end face 155 of the cap sleeve 151'. By this arrangement, the lens 139 of the modified terminus 103' will not come into physical contact with a structure abutting the end face 155. Hence, the modified terminus 103' has lens 139 recessed from end face 155 creating a fixed minimum lens separation to the mating connector.

FIG. 16 also illustrates that the lens 139 may be slightly distanced from the end of the optical fiber 133. An optical epoxy 137 adheres the lens 139 to the end of the optical fiber 133. The optical epoxy 37 would be applied by the field technician either directly to the end of the ferrule 105 and/or to the lens 139 using a syringe prior to inserting the ferrule 105, such that light exiting the termination end of the optical fiber 133 passes through the optical epoxy 137 prior to entering into the lens 139. Also, an inspection slot or small hole 157 could be provided in a side wall of the cap sleeve 151' proximate the lens 139, which affords a view of an area between the lens 139 and the second end 111 of the ferrule 105 when the cap sleeve 151 is attached to the ferrule 105. The hole 157 would also permit the optical epoxy 137 to be applied using a syringe and the hole 157 would function as a vent.

Also, if the small hole 157 is provided, the technician may use a scope to peer through the hole 157 to view the status of the optical epoxy 137 and the connection of the lens 139 to the optical fiber 133 and the second end 111 of the ferrule 105. The technician may add optical epoxy 137 and/or position the end of the optical fiber 133 a preferred distance from lens 139 while viewing the gap through hole 157. Of course the hole 157 and optical epoxy 137 could be used in the embodiment depicted in FIG. 15 where the lens 139 slightly protrudes from the end face 155 of the cap sleeve 151.

The optical epoxy 137 will be the same or similar to the optical epoxy 37 described earlier. Namely, the optical epoxy could have optical characteristics matching or close to the optical characteristics of the optical fiber 133 or the lens 139, or between the optical characteristics of the optical fiber 133 and the lens 139. For example, The optical epoxy 137 may have an index of refraction value (e.g. 1.57) which is between the index of refraction value (e.g. 1.46 to 1.49) of the optical fiber 133 and the index of refraction value (e.g. 1.7) of the lens 139. For example, the epoxy 37 could have an index of refraction value between about 1.4 and 1.8.

In the embodiments of FIGS. 14-16, it can be seen that the cap sleeve 151/151' does not completely seat against the retaining sleeve 121. A gap 159 circumscribes the area between the cap sleeve 151/151' and the retaining sleeve 121. This gap 159 can serve the purpose of a retaining feature, providing an anchoring structure for interaction with other objects (e.g., connector envelopes). Like the cutout 85 in the embodiment of FIG. 5B. The gap 159 could be engaged by other fixing devices of secondary structures. For example, a crimp in a secondary structure could protrude into the gap 159 to fix the terminus 103/103' of FIGS. 14-16 to the secondary structure.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A fiber optic cable apparatus comprising:
   a ferrule formed as a single substantially-uniform diameter cylinder from a first end to a second end, and having a bore passing from the first end to the second end;
   an optical fiber passing through said bore of said ferrule, said optical fiber having a termination end proximate said second end of said ferrule;
   a cap sleeve sized to fit over said second end of said ferrule and directly contact said ferrule for attachment thereto;
   a lens within said cap sleeve, wherein said lens resides proximate said second end of said ferrule when said cap sleeve is attached to said ferrule, wherein said lens is a barrel lens; and
   an optical epoxy connecting said termination end of said optical fiber to said barrel lens, such that light exiting said termination end of said optical fiber passes through said optical epoxy prior to entering into said barrel lens.

2. The fiber optic cable apparatus according to claim 1, wherein said barrel lens has a generally cylindrical mid-region and includes a first convex surface on a first end of said generally cylindrical mid region.

3. The fiber optic cable apparatus according to claim 2, wherein said barrel lens includes a second convex surface on an opposite, second end of said generally cylindrical mid-region.

4. The fiber optic cable apparatus according to claim 3, wherein said generally cylindrical mid-region has a diameter which is approximately equal to an inner diameter of said cap sleeve.

5. The fiber optic cable apparatus according to claim 4, wherein said barrel lens is attached to said cap sleeve by an epoxy.

6. The fiber optic cable apparatus according to claim 5, wherein a portion of said barrel lens protrudes past an end face of said cap sleeve.

7. The fiber optic cable apparatus according to claim 1, further comprising:
   a retaining sleeve sized to fit over said first end of said ferrule and directly contact said ferrule for attachment thereto.

8. The fiber optic cable apparatus according to claim 7, wherein said retaining sleeve includes a through slot which affords access to an area adjacent said first end of said ferrule when said retaining sleeve is attached to said ferrule.

9. A fiber optic cable apparatus comprising:
   a ferrule formed as a single substantially-uniform diameter cylinder from a first end to a second end, and having a bore passing from the first end to the second end;
   an optical fiber passing through said bore of said ferrule, said optical fiber having a termination end proximate said second end of said ferrule;
   a cap sleeve sized to fit over said second end of said ferrule and directly contact said ferrule for attachment thereto;
   a lens within said cap sleeve, wherein said lens resides proximate said second end of said ferrule when said cap sleeve is attached to said ferrule; and
   an optical epoxy connecting said termination end of said optical fiber to said lens, such that light exiting said termination end of said optical fiber passes through said optical epoxy prior to entering into said lens, wherein said lens has an index of refraction value which is greater than an index of refraction value of said optical fiber.

10. The fiber optic cable apparatus according to claim 9, wherein the index of refraction value of said optical fiber is less than 1.6.

11. The fiber optic cable apparatus according to claim 9, wherein the index of refraction value of said lens is greater than 1.5.

12. The fiber optic cable apparatus according to claim 9, wherein said optical epoxy has an index of refraction value which is between the index of refraction value of said optical fiber and the index of refraction value of said lens.

13. The fiber optic cable apparatus according to claim 9, wherein said optical epoxy has an index of refraction value which is between about 1.4 and 1.8.

14. The fiber optic cable apparatus according to claim 9, wherein the index of refraction value of said optical fiber is between about 1.46 to 1.49.

15. The fiber optic cable apparatus according to claim 9, wherein said lens includes an antireflective coating.

16. The fiber optic cable apparatus according to claim 9, wherein said cap sleeve and said lens are formed as a unitary piece of an optical glass or optical grade polymer.

17. The fiber optic cable apparatus according to claim 16, wherein said cap sleeve and said lens are formed of a polycarbonate, with said lens being molded and/or turned down directly in place within said cap sleeve.

* * * * *